Patented Dec. 6, 1927.

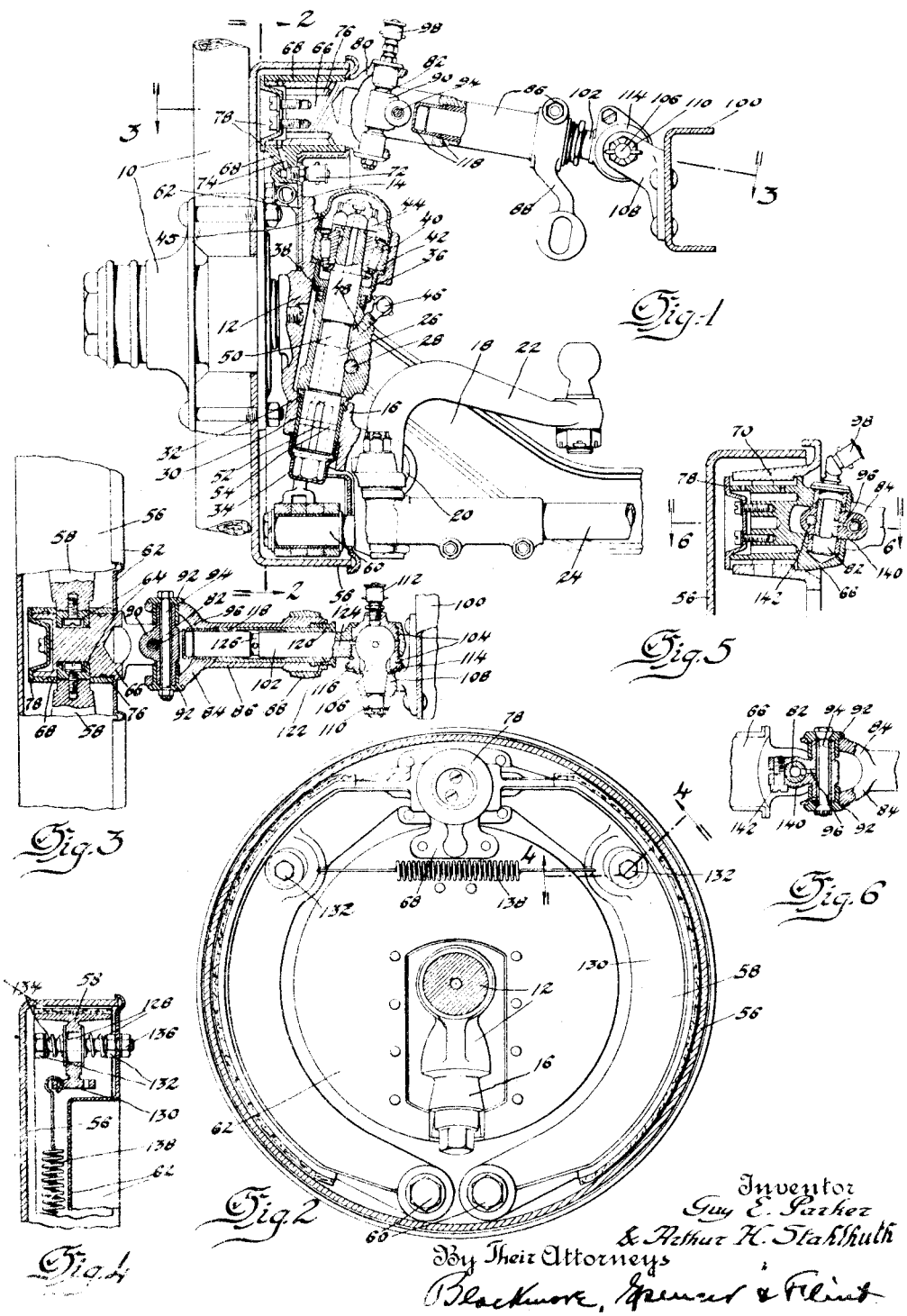

1,651,406

UNITED STATES PATENT OFFICE.

GUY E. PARKER AND ARTHUR H. STAHLHUTH, OF DETROIT, MICHIGAN, ASSIGNORS TO GENERAL MOTORS CORPORATION, OF DETROIT, MICHIGAN, A CORPORATION OF DELAWARE.

VEHICLE BRAKE.

Application filed February 7, 1923. Serial No. 617,535.

This invention relates to vehicles, and is illustrated as embodied in an automobile with a novel form of front wheel having a brake.

An object of the invention is to arrange the wheel and brake to secure a minimum of interference between the braking and steering operations and a maximum of ease of operation. To attain this object, the rock-shaft for the brake cam is operated by a sleeve slidably arranged on a support universally mounted directly on the spring-supported chassis frame, the connection between the sleeve and rock-shaft being in the form of a universal joint substantially in alinement with the steering axis of the wheel.

Having this same object in view, novel lubricating means is preferably provided for the brake cam and the operating connections. In one form the cam and the ends of the band which engage it are inclosed in a casing which is arranged to be kept filled with lubricant.

Other features of the invention relate to a novel arrangement for lubricating the parts which move in steering, by the use of a hollow king pin, and to various other advantageous combinations of parts and desirable particular constructions which will be apparent from the following description of the illustrative embodiments of our invention shown in the accompanying drawings, in which Fig. 1 is a view, partly in rear elevation, and partly in vertical section, of a front or steering wheel and its associated brake and axle;

Fig. 2 is a section on the line 2—2 of Fig. 1, showing parts of the brake in side elevation;

Fig. 3 is a section on the line 3—3 of Fig. 1, showing the connections for operating the brake cam;

Fig. 4 is a section on the line 4—4 of Fig. 2, showing the means for positioning the brake band laterally;

Fig. 5 is a section corresponding to part of Fig. 1, and showing a modified form of universal joint; and Fig. 6 is a section on the line 6—6 of Fig. 5, showing the modified universal joint.

In the form shown in Figs. 1–4, a front or steering wheel 10 is mounted on a stub axle carried by a knuckle 12 forked at 14, 16 to embrace the end of a fixed axle 18. Fork 16 is continued at right angles (up from the paper in Fig. 1) as shown at 20, and a steering arm 22 is secured to it and it is connected by a ball-and-socket joint to a rod 24 connecting it to the opposite wheel.

The knuckle 12 and axle 18 are connected by a king pin 26, fastened to axle 18 by a key 28, the bottom end of the king pin being journaled in a bearing in fork 16 comprising a bushing 30 seated against a packing 32. A cap 34 is threaded on bushing 30 over the end of the king pin to protect it from dust, etc., and to prevent the loss of lubricant.

The top of the king pin is journaled in a bearing in fork 14 comprising a bushing or seat 36 engaging a packing 38, and tapered rollers 40 and rings 42 constituting an annular roller thrust bearing, the king pin being held in place by a castellated nut 44. A dust cap 45 is threaded into the opening in fork 14.

As shown in Fig. 1, the king pin is hollow, and a grease cup 46 and a passage 48 therefrom are provided for the introduction of lubricant to an annular groove 50 and through a hole or holes drilled through the sides of the king pin into its hollow interior. The lubricant passes out of the top of the pin for the top bearing, and through holes 52 into grooves 54 for the lower bearing.

The brake comprises a drum 56 and a band 58 consisting of two shoes pivotally mounted at 60 on a plate 62 which covers the open end of the drum, and which is carried by knuckle 12. Bearing pieces 64 are screwed to the ends of the band, and engage opposite sides of a cam 66 mounted in a cylindrical support 68 secured to plate 62. In the modification shown in Fig. 5, the support and plate are formed in one integral member 70.

According to one feature of the invention, means is provided for lubricating cam 66, including a grease cup 72 communicating with a passage 74 in support 68, which in turn communicates with the hollow end of the cam through a slot in the side of the cam. Passages 76 are formed in the cam to distribute the lubricant, and a covering piece such as a gasket 78 attached to the cam prevents escape of the lubricant.

The cam is integral with a short rockshaft formed with a yoke 80 secured by a hollow vertical pin 82 to a horizontal yoke 84 on a sleeve 86 having an arm 88 for operating the cam. Pin 82 carries a member 90 formed with hollow extensions carrying caps 92 on which the yoke 84 turns, the caps being held by a bolt 94. A hole 96 provides communication between the interior of pin 82 and the interior of member 90, and a grease cup 98 is arranged to introduce lubricant into pin 82, holes being drilled to distribute the lubricant. The whole structure provides a lubricated universal joint in alinement with king pin 26, so that the steering and braking operations do not interfere with one another.

Sleeve 86 is slidably arranged on a support universally mounted directly on the spring-supported frame 100, the support being in the form of a pin 102 carrying half-sockets 104 embracing a ball 106 having an extension journaled in a bracket 108 riveted to frame 100. A castellated nut 110 holds the ball and its extension in place and one half-socket 104 is threaded into the pin 102 to hold the whole joint together.

In order to lubricate the sliding connection and the ball-and-socket joint, a grease cup 112 communicates with the hollow interior of ball 106, and holes are drilled through the sides of the ball in alinement with the groove between adjacent faces of the half-sockets 104. A retainer 114 with a packing 116 prevent loss of lubricant around the extension at the side of the ball. The pin 102 slides in a cup 118 seated in sleeve 86, and held by a bushing 120 engaging a packing 122. The pin is hollow, as shown at 124, to receive lubricant from the above-described groove between adjacent faces of the half-sockets 104. A hole drilled through the side of the pin permits the lubricant to pass to an annular groove 126 in registry with an internal groove formed in cup 118.

The band is positioned laterally by springs 128 engaging washers seated against opposite faces of the web 130 of band 58, the springs being confined by nuts 132 on a bolt 134 held in plate 62 by a nut 136. A spring 138, which holds the band against the cam, is attached to the web at opposite sides.

The modification shown in Figs. 5 and 6 differs from the one described above, in the substitution of a member 140 for member 90, member 140 being split and provided with a binding screw 142 to clamp it to pin 82.

It is not our intention to limit the scope of our invention by the foregoing detailed description of illustrative embodiments of our invention, or otherwise than by the terms of the appended claims, as obviously various substitutions and modifications may be made without departing from its spirit.

We claim:

1. A vehicle comprising in combination, a wheel and axle arranged for relative steering movement about a generally vertical axis, a brake having an operating device arranged for steering movement with the wheel, a spring supported frame, a spherical member supported on said frame and a telescopic reach member operatively connected to said brake operating device and having a side opening in the end thereof adjacent the frame, and which opening is adapted to receive said spherical member.

2. A vehicle comprising in combination, a wheel and axle arranged for relative steering movement about a generally vertical axis, a brake having an operating device arranged for steering movement with the wheel, a spring supported frame, a ball supported from said frame, a pin having a socket in the end thereof adjacent the frame, and which socket has a side opening fitting over said ball, and a sleeve slidable on said pin and connected to said brake operating device through a universal joint.

3. A vehicle comprising in combination a wheel and axle arranged for relative steering movement about a generally vertical axis, a brake drum rotatable with said wheel, brake shoes arranged in said drum and held from lateral displacement therein, a cylindrical support arranged between adjacent ends of said brake shoes, a cam member insertable into said cylindrical support between adjacent ends of said brake shoes from one side thereof, a cover for said cylindrical support secured to said cam and preventing withdrawal of the same from bewteen the ends of said brake shoes, and operating means associated with said cam.

In testimony whereof we affix our signatures.

GUY E. PARKER.
ARTHUR H. STAHLHUTH.